US005501723A

United States Patent [19]

Andress et al.

[11] Patent Number: 5,501,723

[45] Date of Patent: Mar. 26, 1996

[54] ACTIVATED CARBON FILTER FOR VENTING A FUEL TANK

[75] Inventors: Heinz Andress, Erdmannhausen; Karl-Ernst Hummel, Bietigheim-Bissingen; Arthur Klotz, Remseck; Thomas Schermuly, Flein, all of Germany

[73] Assignee: Filterwerk Mann & Hummel GmbH, Ludwigsburg, Germany

[21] Appl. No.: 260,309

[22] Filed: Jun. 15, 1994

[30] Foreign Application Priority Data

Jun. 19, 1993 [DE] Germany .......................... 43 20 384.1

[51] Int. Cl.[6] .................................................... B01D 53/04

[52] U.S. Cl. ................................ 96/131; 96/130; 96/132; 96/137; 96/141; 96/147; 96/149; 96/152

[58] Field of Search .................... 96/108, 121, 130–132, 96/134, 135, 137, 139–141, 147, 149, 152

[56] References Cited

U.S. PATENT DOCUMENTS

| | | | |
|---|---|---|---|
| 1,593,137 | 7/1926 | O'Rourke et al. | 96/131 |
| 3,683,597 | 8/1972 | Beveridge et al. | 96/139 X |
| 3,730,158 | 5/1973 | St. Amand | 96/130 X |
| 4,058,380 | 11/1977 | King, II | 55/387 |
| 4,193,383 | 3/1980 | Rogers | 96/139 X |
| 4,203,401 | 5/1980 | Kingsley et al. | 96/130 X |
| 4,306,894 | 12/1981 | Fukami et al. | 96/131 |
| 4,308,840 | 1/1982 | Hiramatsu et al. | 96/130 X |
| 4,381,929 | 5/1983 | Mizuno et al. | 55/316 |
| 4,448,594 | 5/1984 | Kozawa | 96/137 X |
| 4,581,047 | 4/1986 | Larsson | 96/131 |
| 4,598,686 | 7/1986 | Lupoli et al. | 96/139 X |
| 4,717,401 | 1/1988 | Lupoli et al. | 96/141 |
| 5,002,596 | 3/1991 | Moskaitis et al. | 96/152 |
| 5,110,330 | 5/1992 | Loughran | 96/134 |
| 5,148,793 | 9/1992 | Reddy | 96/131 X |
| 5,207,808 | 5/1993 | Haruta et al. | 96/139 X |
| 5,304,235 | 4/1994 | Watanabe et al. | 96/134 X |

FOREIGN PATENT DOCUMENTS

| | | | |
|---|---|---|---|
| 0029704 | 8/1907 | Austria | 96/132 |
| 514961 | 11/1992 | European Pat. Off. . | |
| 2407128 | 9/1974 | Germany . | |
| 4124653 | 1/1993 | Germany . | |
| 55-119419 | 9/1980 | Japan | 96/130 |
| 60-206969 | 10/1985 | Japan | 96/130 |
| 4-161215 | 6/1992 | Japan | 96/108 |

*Primary Examiner*—Robert H. Spitzer

*Attorney, Agent, or Firm*—Evenson, McKeown, Edwards & Lenahan

[57] ABSTRACT

An activated carbon filter is provided for venting a fuel tank. The activated carbon filter consists of a housing which accommodates activated carbon packets. Via lines, the housing is connected, on the one hand, by way of a first connection with the fuel tank, and on the other hand, by way of a second connection with the intake pipe, particularly that of a combustion engine. A third connection connects the housing with the atmosphere. The housing has a first partition which extends between the connection for the atmosphere and the connection for the tank. At least one other partition is provided which forms at least one other chamber. Each of the chambers is filled with activated carbon.

11 Claims, 4 Drawing Sheets

ACTIVATED CARBON FILTER FOR VENTING A FUEL TANK

FIELD OF THE INVENTION

This invention relates to an activated carbon filter for venting a fuel tank and, more particularly, to an activated carbon filter for venting a fuel tank including a housing which holds an activated carbon packet. The housing is connected via lines through a first connection with the fuel tank, a second connection with the intake pipe, particularly that of an internal-combustion engine, and by a third connection with the atmosphere.

BACKGROUND OF THE INVENTION

Activated carbon filters of the above-described type are generally known. As a rule, they have an activated carbon packet contained in a housing made of plastic. The housing is connected, through the use of connection pieces or lines, with the fuel tank, with the intake pipe of an internal-combustion engine, as well as with the atmosphere.

A similarly constructed adsorption system is known from U.S. Pat. No. 4,058,380. In this patent, the inside volume of the housing which accommodates the absorbing material is divided into two areas via a partition.

Furthermore, from German Patent document DE-OS 41 24 653, an activated carbon filter is known which consists of an oval housing having a partition arranged therein. An activated carbon packet arranged in the oval housing is prestressed by pressure springs in order to prevent any shaking-up of the activated carbon and, therefore, any possible disturbance.

In the case of the known activated carbon filters, an interior housing consisting of plastic is surrounded by a fuel and vapor impermeable outer housing. This known filter is expensive because the outer housing cannot accommodate the required connection pieces and thus an additional cover must be used. In addition, the outer housing must be placed over the inner housing in a sealing manner so that the inner housing, which is fuel and vapor permeable, cannot emit any harmful gases into the environment.

There is therefore needed an activated carbon filter which can be manufactured in a much simpler manner, while having a high filtering efficiency.

SUMMARY OF THE INVENTION

These needs are met according to the present invention by providing an activated carbon filter for venting a fuel tank including a housing which holds an activated carbon packet. The housing is connected via lines through a first connection with the fuel tank, a second connection with the intake pipe, particularly that of an internal-combustion engine, and by a third connection with the atmosphere. A first partition is arranged in the housing. The partition extends between the connection for the atmosphere and the connection for the fuel tank. At least one additional partition is further provided in the housing. The additional partition forms at least one other chamber in the filter. The chamber is filled with activated carbon. If desired, additional mechanical components, such as valves, may be arranged in the at least one further chamber.

An important advantage of the present invention is the fact that, due to the arrangement of at least two mutually crossing partitions, at least four filter chambers are created through which the fuel vapors successively flow. A significant improvement of the adsorption of the fuel vapor is therefore achieved. It is also possible to install additional partition walls whereby the number of filter chambers can be increased arbitrarily. This novel arrangement specifically results in considerable advantages for filters which have a flat construction and are installed in an essentially horizontal manner. Thus, in the case of filters according to the present invention, no springs are required for prestressing the activated-carbon packet because a bypass or short, which ms caused by the depositing of the activated carbon, is not possible.

An advantageous further embodiment of the present invention provides for designing the partitions such that the fuel vapors successively flow through all chambers in a strictly guided manner. Because of the relatively large flow-through cross-section of a respective chamber, a slower flow rate is achieved which ensures a high adsorption.

According to a further embodiment of the present invention, the partition between the first and the last chamber, that is, between the inlet chamber and the outlet chamber, is completely sealed-off so that a gas exchange between the two chambers is impossible under any operating condition.

A further embodiment of the present invention relates to the respective side face coverings of the activated carbon. For this purpose, a so-called filter foam is provided in an advantageous manner. The filter foam is used to cover the activated carbon on one or two sides, and generates a certain prestress of the activated carbon due to the foam's elasticity.

For guiding the fuel vapors, a further embodiment of the present invention provides ducts in one or both side face coverings of the housing. These ducts are developed such that they increase the stability of the coverings while at the same time permitting the supporting function of the activated carbon and the filter foam.

The lines joining the intake pipe of a combustion engine, and the fuel tank, to the housing may be clipped, locked, welded or injection-molded onto the housing. The cover of the housing is also vibration-welded or flush-welded to the housing. For fastening the filter foam or a nonwoven filter in the area of the ducts, it is advantageous to slightly melt the surface of these ducts by thermal heating and to place the nonwoven or the filter foam in the resulting slightly melted plastic. This arrangement provides a secure connection with respect to vibrations and impact forces.

These and other characteristics of preferred further embodiments of the invention are found in the specification and the drawings, in addition to the claims, in which case the individual characteristics may be implemented separately or combined in the form of subcombinations in the case of the embodiment of the invention and in other fields, and may represent advantageous as well as separately patentable constructions, for which protection is claimed here.

Other objects, advantages and novel features of the present invention will become apparent from the following detailed description of the invention when considered in conjunction with the accompanying drawings.

DETAILED DESCRIPTION OF THE PREFERRED EMBODIMENTS

Figures 1, 1A, 1B, 1C, 1D:
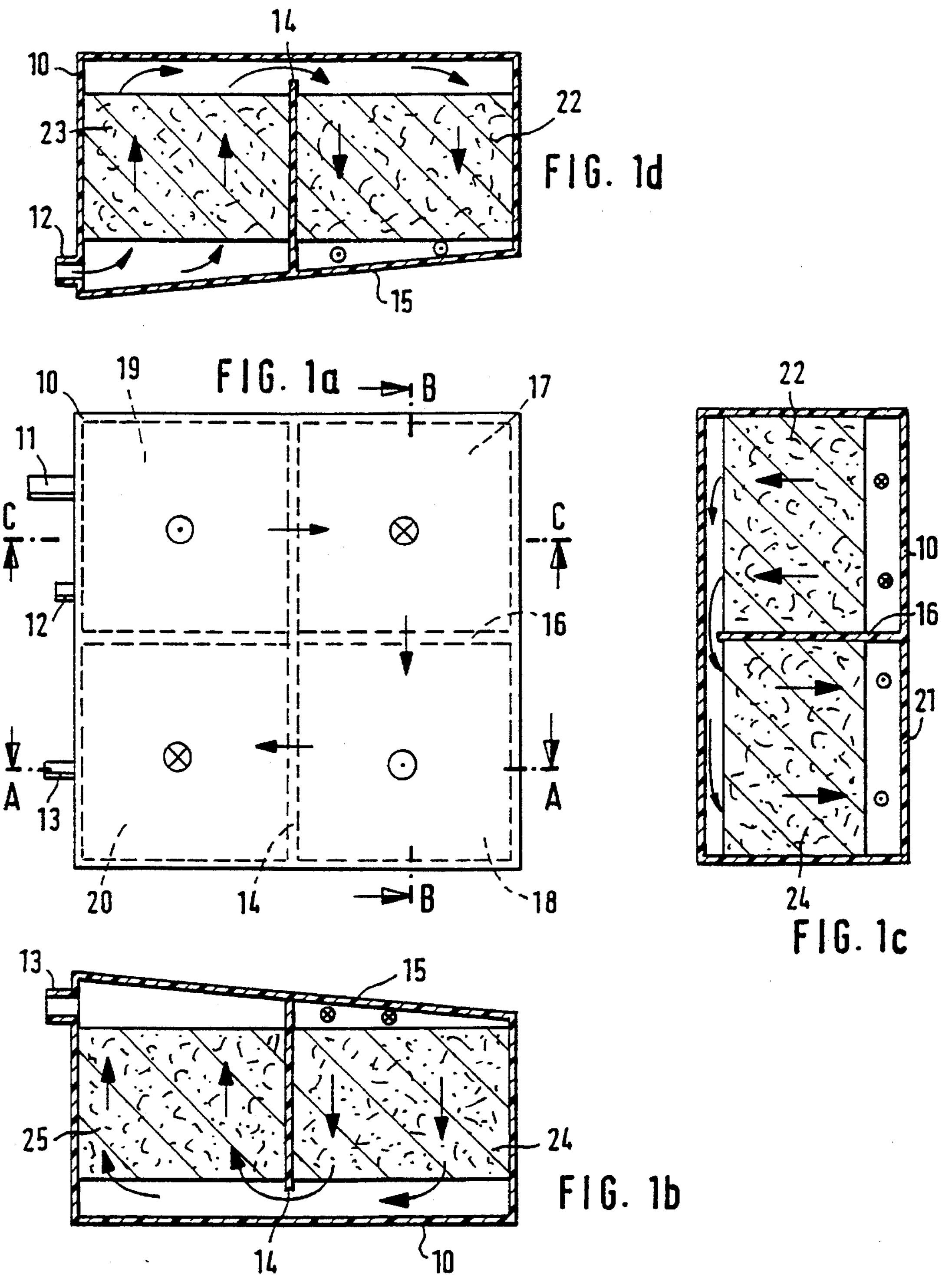
FIGS. 1_a_–1_d_ provide a schematic top view and three sectional views, respectively, of an activated carbon filter according to the present invention.

FIGS. 1*a*–1*d* are schematic representations of an activated carbon filter. The activated carbon filter comprises a housing 10 which has a first connection 11. This first connection 11 is connected with the intake pipe of an internal-combustion engine (not shown). In addition, a second connection 12 is provided which is connected with a fuel tank (not shown). Fuel vapors are supplied through the second connection 12. Furthermore, a connection 13 is provided. This connection 13 is connected with the atmosphere.

A first partition 14 is arranged in the housing of the activated carbon filter. This first partition 14 is connected with a floor 15 of the housing 10. Between the chamber 17 and the chamber 18, an additional partition 16 is connected with a cover 21 and, in the area between the chambers 19, 20, the additional partition is connected with the cover 21 as well as the floor 15. This ensures a complete separation between chamber 19 and chamber 20. The chambers 17 to 20, respectively, are each filled with an activated carbon packet 22, 23, 24, 25. The activated carbon is provided on its side faces with nonwoven filter layers which prevent a discharge of the activated carbon. The chambers may be filled with activated carbon having different pore structures. If desired, the chambers may have different cross-sections and lengths.

As illustrated in section C—C (FIG. 1*d*), the gasoline or fuel vapors, which flow in by way of the tank connection 12, arrive in the activated carbon packet 23. The fuel vapors flow upwards and, via a connection, arrive at the activated carbon packet 22. The fuel vapors then flow downward and finally arrive at activated carbon packet 24 (FIG. 1*b*) where they flow through this activated carbon packet 24 and then through activated carbon packet 25. The fuel vapors are therefore successively guided through all four chambers. The hydrocarbons are absorbed completely, and only the remaining fresh air portion flows out into the atmosphere.

As soon as the operation of the internal-combustion engine has started, gas is sucked out of the active carbon filter via the connection 11. As a result, fresh air flows via the connection 13 into the activated carbon filter and regenerates the carbon filter.

Figure 2:
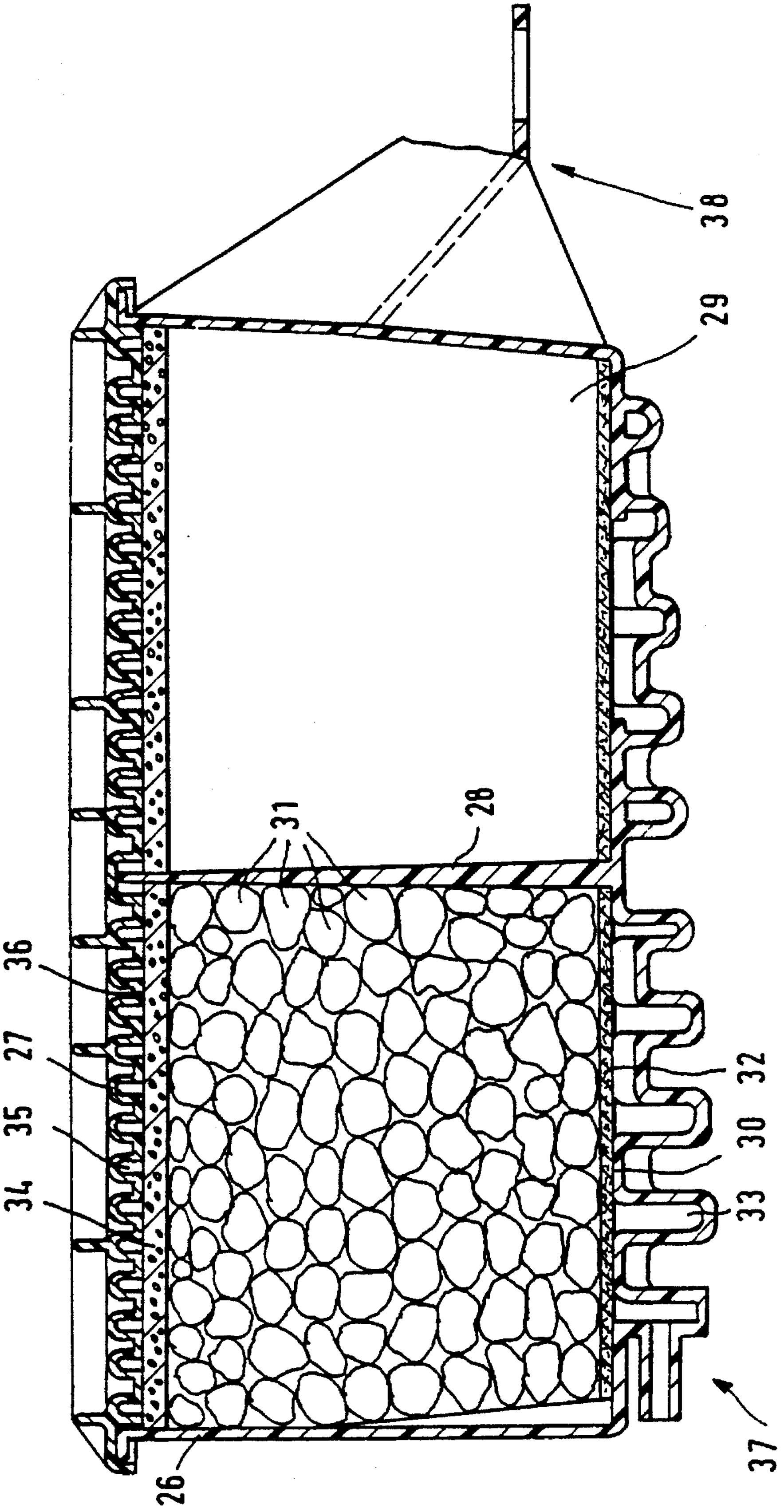
FIG. 2 is a cross-sectional view of an activated carbon filter.

FIG. 2 is a cross-sectional view of a more detailed construction of an activated carbon filter. This activated carbon filter has a housing 26 on which a cover 27 is arranged. The housing 26, as well as the cover 27, consist of a thermoplastic material. The cover can therefore be connected with the housing, for example, by means vibration welding.

A partition 28 is integrated in the housing. In addition, another partition 29 is provided which extends at a right angle with respect to partition 28. For a better representation of the construction, the activated carbon 31 is shown only in chamber 30.

In the lower or bottom area, the activated carbon is bounded by a nonwoven filter mat 32 with respect to the ducts 33. A filter foam 34 is arranged in the upper area. The filter foam 34 rests on end pieces 36 of an inner surface of the cover 27. The cover 27 has an outer curved design. Ducts 35 are provided between the end pieces 36 for allowing the fuel vapors to flow through. The entire activated carbon filter can be fastened to a receiving device through the use of a connection flange 37, 38.

Figure 3A:
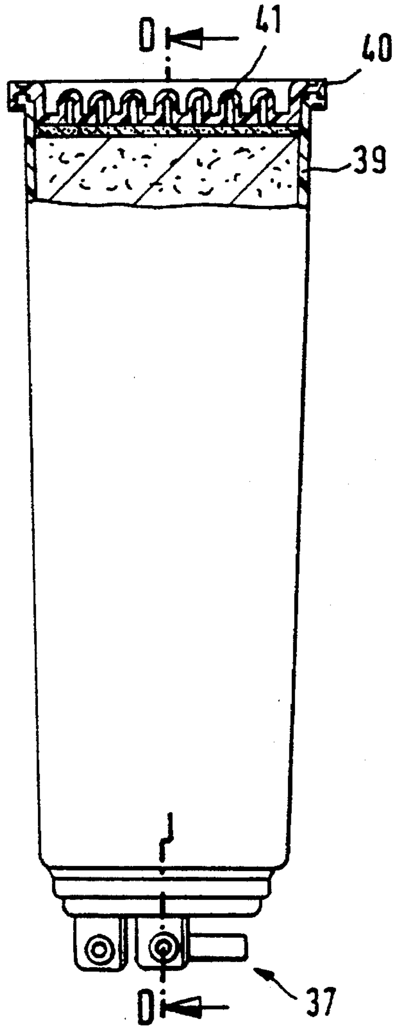
FIG. 3_a_ is a view of another embodiment of an activated carbon filter according to the present invention.
FIG. 3*b* is a cross-sectional view taken along line D—D in FIG. 3*a*.
FIGS. 3*c*–3*e* are views of different embodiments for the connections to the activated carbon filter.
Figure 3B:
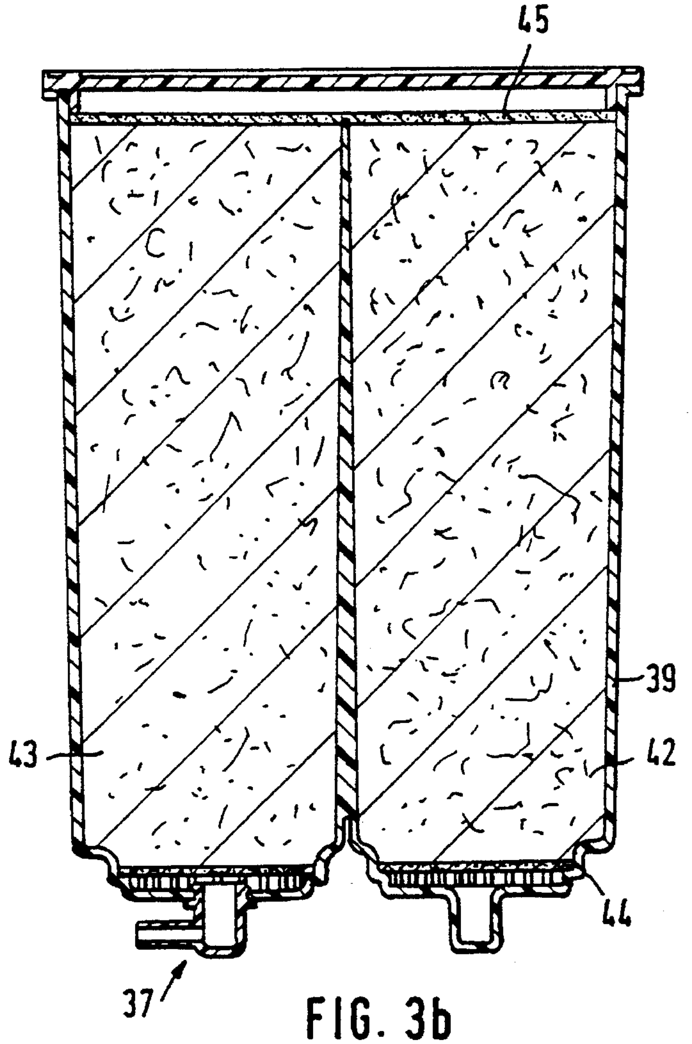

FIGS. 3*a* and 3*b* show another embodiment of an activated carbon filter according to the invention.

FIG. 3*a* is a lateral side view of a filter. A housing 39 is provided with a cover 40. In this case, the cover 40 and the housing 39 both consist of a thermoplastic material and are welded together. The cover has ducts 41 through which the fuel vapors are guided from one chamber to the next chamber. Connections 37 for the atmosphere, the tank and the intake pipe are situated in the lower area of the housing 39. As illustrated on the right side of FIG. 3*b*, these connections 37 may be fastened on an opening of the housing 39 by means of rotary welding or flush welding. A direct injection molding of the connections with the housing is also possible.

Figure 3C:
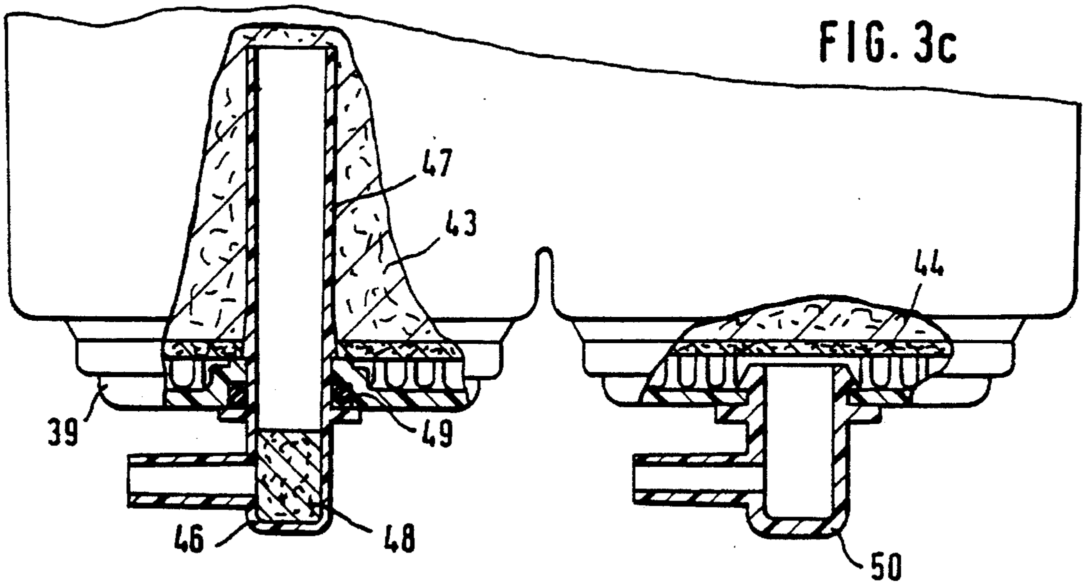

FIG. 3*c*, in a different embodiment, shows a connection 46 for the feeding of fuel vapors. The connection 46 is clipped onto the housing 39. This connection 46 is provided with an immersion pipe 47 and has a filter element 48 which prevents a discharge of activated carbon. The connection 46 is sealed-off on the housing 39 by means of an O-ring seal 49. A connection 50 for feeding fresh air is arranged on the right chamber of the activated carbon filter. This connection 50 is also clipped onto the housing. An additional seal is not required in this case.

Figure 3D:
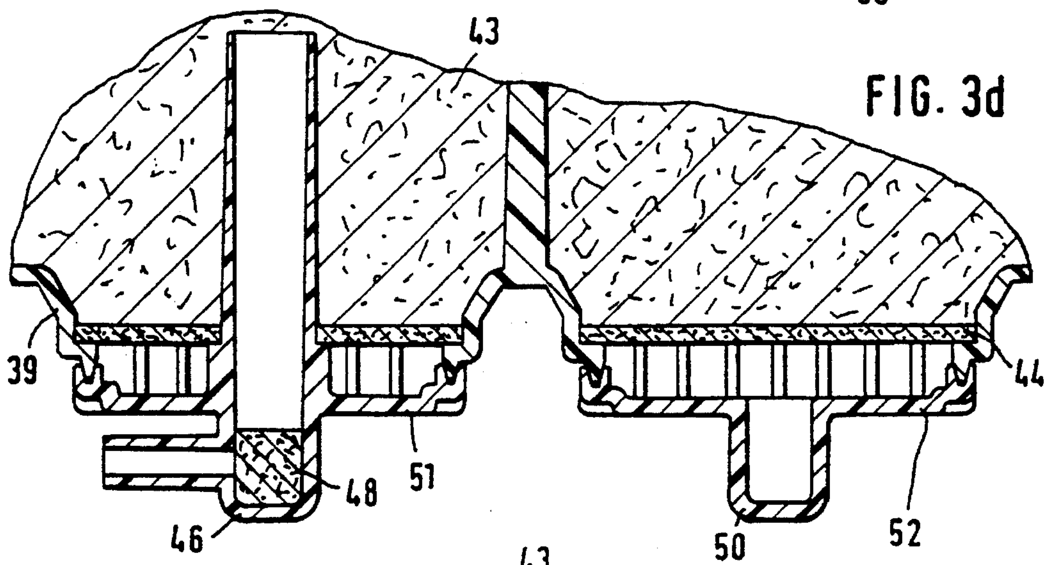

A further embodiment of the fastening connection is illustrated in FIG. 3*d*. In this case, the connection 46 is provided with a cover element 51 which is vibration welded to the housing 39. The connection 50 for feeding fresh air also has a cover element 52. This cover element 52 is also vibration welded to the housing 39.

Figure 3E:
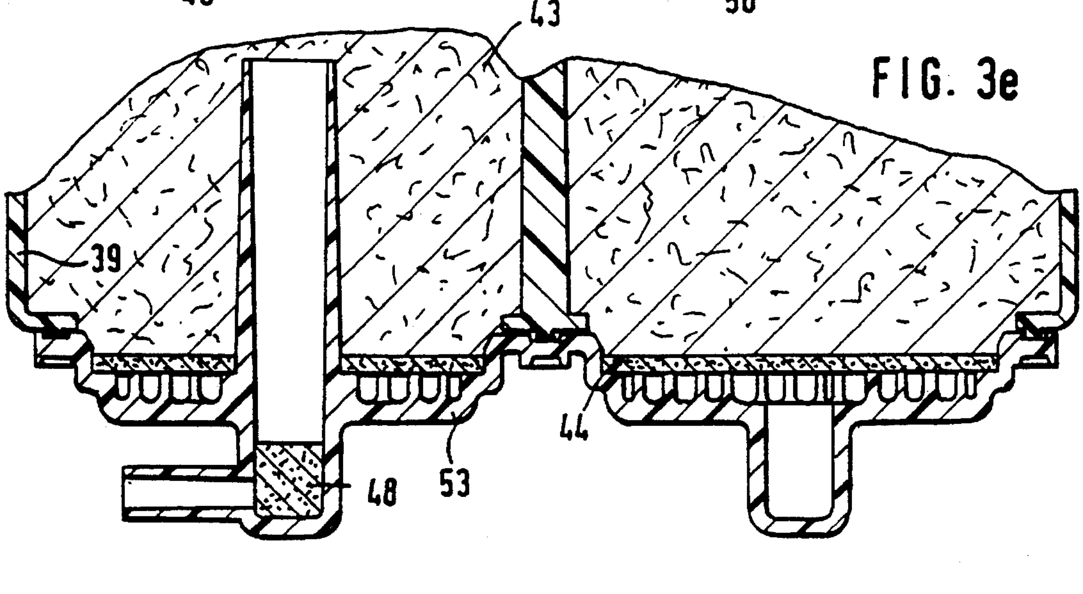

FIG. 3*e*, in a still further embodiment, also illustrates a cover 53 containing all of the necessary connections. The cover 53 is fastened to the housing 39 in one operating step through the use of vibration welding.

The activated carbon 42, 43 inside the housing 39 is covered in the lower area by a nonwoven filter 44 and in the upper area by a filter foam 45. The filter foam 45 has an elasticity which generates a certain prestress upon the activated carbon 42, 43 and thus prevents relative movement of the activated carbon in case of shocks or vibrations.

FIGS. 3*a* and 3*b* show an activated carbon filter with two chambers. Naturally, it is possible to expand this activated carbon filter to four or more chambers as would be readily understood by those of ordinary skill in this art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An activated carbon filter for venting a fuel tank for an internal combustion engine having an intake pipe, comprising:

a housing having a floor and a cover for holding activated carbon;

a first connection for coupling said housing with the fuel tank;

a second connection for coupling said housing with the intake pipe;

a third connection for coupling said housing with the atmosphere;

a first partition arranged in said housing and extending between said first and third connections so as to form two chambers;

at least one chamber being filled with activated carbon;

and wherein at least one of said cover and said floor is configured with a plurality of elongated parallel grooves therein which form individual guiding ducts extending from one chamber to the other through which fuel vapors flow from the one chamber to the other chamber.

2. An activated carbon filter according to claim 1, wherein said chambers are each connected with one another such that fuel vapors successively flow through said chambers filled with activated carbon.

3. An activated carbon filter according to claim 1, wherein a complete separation is provided between the chamber having the first connection and the chamber having the third connection.

4. An activated carbon filter according to claim 1, wherein the activated carbon is provided in said chambers at an inlet and at an outlet of the flow-through gases, and further comprising a filter foam and one of a felt and nonwoven filter arranged in said housing to prevent a discharge of activated carbon.

5. An activated carbon filter according to claim 4, wherein said filter foam and one of said felt and nonwoven filter are connected with a cover and supporting body, respectively, by one of gluing and melting-on of the cover or supporting body.

6. An activated carbon filter according to claim 1, wherein said connections are one of locked and clipped onto said housing.

7. An activated carbon filter according to claim 1, wherein said connections and said housing cover are made of plastic and are welded to said housing.

8. An activated carbon filter according to claim 1, wherein said chambers are filled with activated carbon having different pore structures.

9. An activated carbon filter according claim 1, wherein said chambers have different cross-sections and lengths.

10. An activated carbon filter according to claim 1, wherein said guiding ducts form a stability reinforcing structure for said at least one of said cover and said floor.

11. An activated carbon filter according to claim 1, wherein adjacent grooves are separated by projecting portions with ends which support a nonwoven filter mat or a filter foam interposed between the activated carbon and said guiding ducts.

* * * * *